United States Patent
Dimou

(10) Patent No.: US 9,622,279 B2
(45) Date of Patent: Apr. 11, 2017

(54) DYNAMIC SPECTRUM BAND SELECTION FOR D2D COMMUNICATIONS

(75) Inventor: Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1052 days.

(21) Appl. No.: 13/591,795

(22) Filed: Aug. 22, 2012

(65) Prior Publication Data
US 2014/0056230 A1 Feb. 27, 2014

(51) Int. Cl.
H04W 4/00 (2009.01)
H04W 76/02 (2009.01)
H04W 72/04 (2009.01)

(52) U.S. Cl.
CPC ....... H04W 76/023 (2013.01); H04W 72/048 (2013.01)

(58) Field of Classification Search
CPC .................................................. H04W 76/023
USPC ........................................................ 370/329
See application file for complete search history.

(56) References Cited

U.S. PATENT DOCUMENTS

| | | | |
|---|---|---|---|
| 8,913,530 B2 | 12/2014 | Dimou et al. | |
| 8,914,054 B2 | 12/2014 | Dimou et al. | |
| 8,914,055 B2 | 12/2014 | Dimou et al. | |
| 2004/0048609 A1* | 3/2004 | Kosaka | H04W 56/002 455/422.1 |
| 2004/0053574 A1* | 3/2004 | Klein | H04W 52/281 455/63.1 |
| 2007/0211677 A1 | 9/2007 | Laroia et al. | |
| 2008/0310329 A1 | 12/2008 | Sun et al. | |
| 2009/0010185 A1 | 1/2009 | Li et al. | |

(Continued)

FOREIGN PATENT DOCUMENTS

| | | |
|---|---|---|
| EP | 2012443 A2 | 1/2009 |
| WO | 2011088619 A1 | 7/2011 |

(Continued)

OTHER PUBLICATIONS (Adaptive TDD UL/DL Slot Utilization for Cellular Controlled D2D Communications, Li et al , 2011).*

(Continued)

*Primary Examiner* — Chi H Pham
*Assistant Examiner* — Abdeltif Ajid
(74) *Attorney, Agent, or Firm* — Withrow & Terranova, PLLC

(57) ABSTRACT

The present disclosure provides systems and methods for selecting a resource for a direct device-to-device (D2D) communication link between wireless devices in a cellular communication network. In one embodiment, a control node in a cellular communication network selects a resource for a direct D2D communication link between a first wireless device and a second wireless device based on one or more criteria including a service area type of a service area within the cellular communication network in which the first wireless device and the second wireless device are located. The service area type is either homogeneous or heterogeneous. The control node communicates an indicator of the resource selected for the direct D2D communication link to the first wireless device and/or the second wireless device. Thereafter, the first and second wireless devices communicate over the direct D2D communication link using the selected resource.

25 Claims, 11 Drawing Sheets

(56) References Cited

U.S. PATENT DOCUMENTS

| | | |
|---|---|---|
| 2009/0016229 A1 | 1/2009 | Wu et al. |
| 2009/0016261 A1 | 1/2009 | Laroia et al. |
| 2009/0016363 A1 | 1/2009 | Laroia et al. |
| 2009/0017843 A1 | 1/2009 | Laroia et al. |
| 2009/0034447 A1 | 2/2009 | Yu et al. |
| 2010/0093364 A1 | 4/2010 | Ribeiro et al. |
| 2011/0038328 A1* | 2/2011 | Wang .......... H04W 72/0413 370/329 |
| 2011/0063995 A1 | 3/2011 | Chen et al. |
| 2011/0182280 A1* | 7/2011 | Charbit .......... H04W 56/0045 370/350 |
| 2011/0223953 A1 | 9/2011 | Lee et al. |
| 2011/0228666 A1 | 9/2011 | Barbieri et al. |
| 2012/0020213 A1 | 1/2012 | Horneman et al. |
| 2012/0044815 A1 | 2/2012 | Geirhofer et al. |
| 2012/0202542 A1 | 8/2012 | Dimou et al. |
| 2013/0121222 A1* | 5/2013 | Luo .......... H04W 36/20 370/311 |
| 2013/0210435 A1 | 8/2013 | Dimou et al. |
| 2013/0310077 A1* | 11/2013 | Siomina .......... H04W 4/02 455/456.2 |
| 2014/0003301 A1* | 1/2014 | Madan .......... H04W 72/042 370/280 |
| 2014/0219261 A1* | 8/2014 | Johnsson .......... H04W 76/023 370/338 |

FOREIGN PATENT DOCUMENTS

| | | |
|---|---|---|
| WO | 2011116815 A1 | 9/2011 |
| WO | 2011123799 A1 | 10/2011 |
| WO | 2012015698 A1 | 2/2012 |
| WO | 2013062455 A1 | 5/2013 |

OTHER PUBLICATIONS

Adaptive TDD UL/DL Slot Utilization for Cellular Controlled D2D Communications, Y u. Li et al ,2011).*

On the performance of Device-to-Device underlay communication with simple power control , Chia-Hao et al ,2009).*

Notice of Allowance for U.S. Appl. No. 13/425,836, mailed Aug. 22, 2014, 9 pages.

Final Office Action for U.S. Appl. No. 13/465,303, mailed Jun. 13, 2014, 15 pages.

Notice of Allowance for U.S. Appl. No. 13/465,303, mailed Aug. 15, 2014, 8 pages.

Notice of Allowance for U.S. Appl. No. 13/525,752, mailed Aug. 12, 2014, 9 pages.

Li, Yu et al., "Adaptive TDD UL/DL Slot Utilization for Cellular Controlled D2D Communications," 2011 IEEE Global Mobile Congress, Oct. 17, 2011, pp. 1-6.

Yu, Chia-Hao et al., "On the Performance of Device-to-Device Underlay Communication with Simple Power Control," 2009 IEEE 69th Vehicular Technology Conference, Apr. 26-29, 2009, pp. 1-5, Barcelona, Spain.

International Search Report and Written Opinion for PCT/IB2013/052220, mailed Sep. 5, 2013, 15 pages.

Doppler, K. et al., "Mode Selection for Device-to-Device Communication Underlaying an LTE-Advanced Network," IEEE Wireless Communications and Networking Conference, Sydney, Australia, Apr. 2010, 6 pages.

Doppler, K. et al.,"Device-to-Device Communication as an Underlay to LTE-Advanced Networks," IEEE Communications Magazine, vol. 47, No. 12, Dec. 2009, pp. 42-49.

Corson, M.S. et al., "Towards Proximity-Aware Internetworking," IEEE Wireless Communications, Dec. 2010, pp. 26-33.

Peng, T. et al., "Interference Avoidance Mechanisms in the Hybrid Cellular and Device-2-Device Systems," 2009 IEEE 20th International Symposium on Personal, Indoor and Mobile Radio Communications, Sep. 2009, pp. 617-621.

Yu, C.H. et al., "Power Optimization of Device-to-Device Communication Underlaying Cellular Communication," IEEE International Conference on Communications, ICC, Dresden, Germany, Jun. 2009, 5 pages.

International Search Report and Written Opinion for PCT/IB2013/053631, mailed Nov. 22, 2013, 12 pages.

International Search Report and Written Opinion for PCT/IB2013/054965 mailed Feb. 7, 2014, 10 pages.

Non-Final Office Action for U.S. Appl. No. 13/465,303, mailed Dec. 17, 2013, 13 pages.

International Search Report and Written Opinion for PCT/IB2013/056741, mailed Jan. 16, 2014, 12 pages.

* cited by examiner

DYNAMIC SPECTRUM BAND SELECTION FOR D2D COMMUNICATIONS

RELATED APPLICATIONS

The present application is related to commonly assigned U.S. patent application Ser. No. 13/425,836, filed Mar. 21, 2012, entitled "DYNAMIC RESOURCE SELECTION TO REDUCE INTERFERENCE RESULTING FROM DIRECT DEVICE TO DEVICE COMMUNICATIONS" and commonly assigned U.S. patent application Ser. No. 13/525,752, filed Jun. 18, 2012, entitled "DYNAMIC RESOURCE SELECTION TO REDUCE INTERFERENCE THAT RESULTS FROM DIRECT DEVICE TO DEVICE COMMUNICATIONS, the disclosures of which are hereby incorporated herein by reference in their entireties.

FIELD OF THE DISCLOSURE

The present disclosure relates to direct device-to-device communications in a cellular communication network and more particularly relates to reducing interference resulting from direct device-to-device communications in a cellular communication network.

BACKGROUND

Network-assisted direct device-to-device (D2D) communication is expected to be a key feature supported by next generation cellular communication networks. FIG. 1 illustrates a cellular communication network 10 that enables direct D2D communications. As illustrated, the cellular communication network 10 includes a base station 12 that serves a corresponding cell 14 of the cellular communication network 10. While only one base station 12 is illustrated, the cellular communication network 10 includes numerous base stations 12 serving corresponding cells 14. In this example, wireless devices (WDs) 16, 18, 20, and 22 are located within the cell 14. The wireless devices 16 and 18 are in proximity to one another. As such, when the wireless devices 16 and 18 desire to establish a bearer link, rather than establishing the bearer link through the base station 12, the cellular communication network 10 assists the wireless devices 16 and 18 to establish a direct D2D communication link (i.e., a direct D2D bearer link) between one another. More specifically, through signaling with the base station 12 or some other mechanism, the wireless devices 16 and 18 discover one another using a D2D device discovery process and then establish a D2D communication link directly between one another rather than through the base station 12.

Direct D2D communication is possible regardless of whether the cellular communication network 10 is Frequency Division Duplex (FDD) (i.e., uses different uplink and downlink frequency bands) or Time Division Duplex (TDD) (i.e., uses the same frequency band but different time slots for uplink and downlink). However, it is commonly accepted that direct D2D communication links, such as that established between the wireless devices 16 and 18, is preferably a TDD communication link where transmission by one wireless device uses the same resources as reception by the other wireless device. These "resources" are physical frequency and/or time resources depending on the particular implementation of the cellular communication network 10. TDD (i.e., half duplex operation) is preferred because operating a transmitter and a receiver in the same frequency band in a half duplex fashion is easier to implement than a full duplex FDD implementation.

In order to provide spectral efficiency, it is preferable for the D2D communication link to use the same resources as those used by the cellular communication network 10 where the cellular communication network 10 performs actions such as mode selection, network-controlled scheduling, and power control. In this example, the D2D communication link uses either an uplink resource or a downlink resource of the cellular communication network 10. The same uplink resource or downlink resource is, or at least can be, also used for the uplink from or downlink to another wireless device in the cell 14 such as, for example, the wireless device 22. Likewise, the same uplink resource or downlink resource is, or at least can be, also used for the uplink from or downlink to other wireless devices in neighboring cells. As such, while using the same resources as the cellular communication network 10 provides spectral efficiency, doing so also gives rise to new intra-cell and inter-cell interference situations. For example, due to the presence of D2D communication links, intra-cell orthogonality is no longer maintained.

Specifically, when the D2D communication link between the wireless devices 16 and 18 uses a downlink (DL) resource of the cellular communication network 10 and the same DL resource is also used by the wireless device 22, strong intra-cell interference may be caused for the wireless device 22, as illustrated in FIG. 2. For simplicity and for the clarity of presentation, the case of intra-cell DL interference is displayed in FIG. 2. The case of inter-cell, or other cell, interference resulting from the direct D2D communication link between the wireless devices 16 and 18 can be easily deduced. The transmission from, for instance, the wireless device 16 over the D2D communication link to the wireless device 18 using the DL resource of the cellular communication network 10 may result in interference to a wireless device located in a neighboring cell that uses the same DL resource. It should also be noted that transmissions by the wireless devices 16 and 18 over the direct D2D communication link result in interference to other nearby wireless devices (not shown) regardless of whether those other wireless devices use the same DL resource (e.g., the same resource blocks in an Orthogonal Frequency Division Multiplexing (OFDM) downlink frequency band).

Similarly, when the D2D communication link between the wireless devices 16 and 18 uses an uplink (UL) resource of the cellular communication network 10 and the same UL resource is also used by the wireless device 22, strong intra-cell interference may be caused to the base station 12 serving the cell 14 for the uplink from the wireless device 22, as illustrated in FIG. 3. For instance, transmission by the wireless device 16 over the D2D communication link to the wireless device 18 using an uplink frequency band of the cellular communication network 10 may result in interference to the base station 12 for an uplink from the wireless device 22 using the same uplink frequency band. As with the downlink interference, the case of inter-cell interference resulting from D2D communication using UL resources can easily be deduced. Transmissions from, for example, the wireless device 16 over the D2D communication link to the wireless device 18 using the UL resource may also generate interference to base stations serving neighboring cells for uplinks from wireless devices in the neighboring cells that use the same UL resource. Notably, the base stations that serve the neighboring cells are referred to herein as neighboring base stations. It should also be noted that transmissions by the wireless devices 16 and 18 over the direct D2D communication link using the UL resource result in interference to the base station 12 regardless of whether other wireless devices (not shown) use the same UL resource (e.g., the same resource blocks in an OFDM uplink frequency band).

From the discussion above, it is readily understood that D2D communication using the same resources used for downlinks and uplinks in the cellular communication network 10 results in new interference scenarios not envisioned in conventional cellular communication networks. Further compounding the issue is the fact that the cellular communication network 10 may have both conventional base stations (e.g., eNBs in a Long Term Evolution (LTE) network) and low-power base stations (e.g., pico base stations, Closed Subscriber Group (CSG) Home eNBs, and/or relays in an LTE network). In such a heterogeneous network, D2D communication using the same resources used for downlinks and uplinks in the heterogeneous network result in even more new interference scenarios not envisioned in conventional cellular communication networks. As such, there is a need for systems and methods for minimizing, or at least substantially reducing, interference resulting from D2D communication in a cellular communication network and, in particular, a heterogeneous cellular communication network.

SUMMARY

The present disclosure provides systems and methods for selecting a resource for a direct device-to-device (D2D) communication link between wireless devices in a cellular communication network. Preferably, the resource is either an uplink (UL) resource or a downlink (DL) resource of the cellular communication network. In one embodiment, a control node (e.g., a base station) in a cellular communication network selects a resource for a direct D2D communication link between a first wireless device and a second wireless device based on one or more criteria including a service area type of a service area within the cellular communication network in which the first wireless device and the second wireless device are located. The service area is an area within the cellular communication network served by one or more, but preferably multiple, base stations. The service area type is either homogeneous or heterogeneous. The control node communicates an indicator of the resource selected for the direct D2D communication link to the first wireless device and/or the second wireless device. Thereafter, the first and second wireless devices communicate over the direct D2D communication link using the selected resource. In one embodiment, the resource selected for the direct D2D communication link is dynamically updated based on the one or more criteria.

In one embodiment, the one or more criteria used by the control node to select the resource for the direct D2D communication link also include a radio distance between the first wireless device and a base station closest to the first wireless device and/or a radio distance between the second wireless device and a base station closest to the second wireless device. Still further, in another embodiment, the one or more criteria further include an indicator of whether the base station closest to the first wireless device is equipped with an interference cancellation receiver and/or an indicator of whether the base station closest to the second wireless device is equipped with an interference cancellation receiver. Still further, in another embodiment, the one or more criteria further include an indicator as to whether at least a threshold amount of one or more additional wireless devices that are proximate to the first and second wireless devices are equipped with an interference cancellation receiver.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
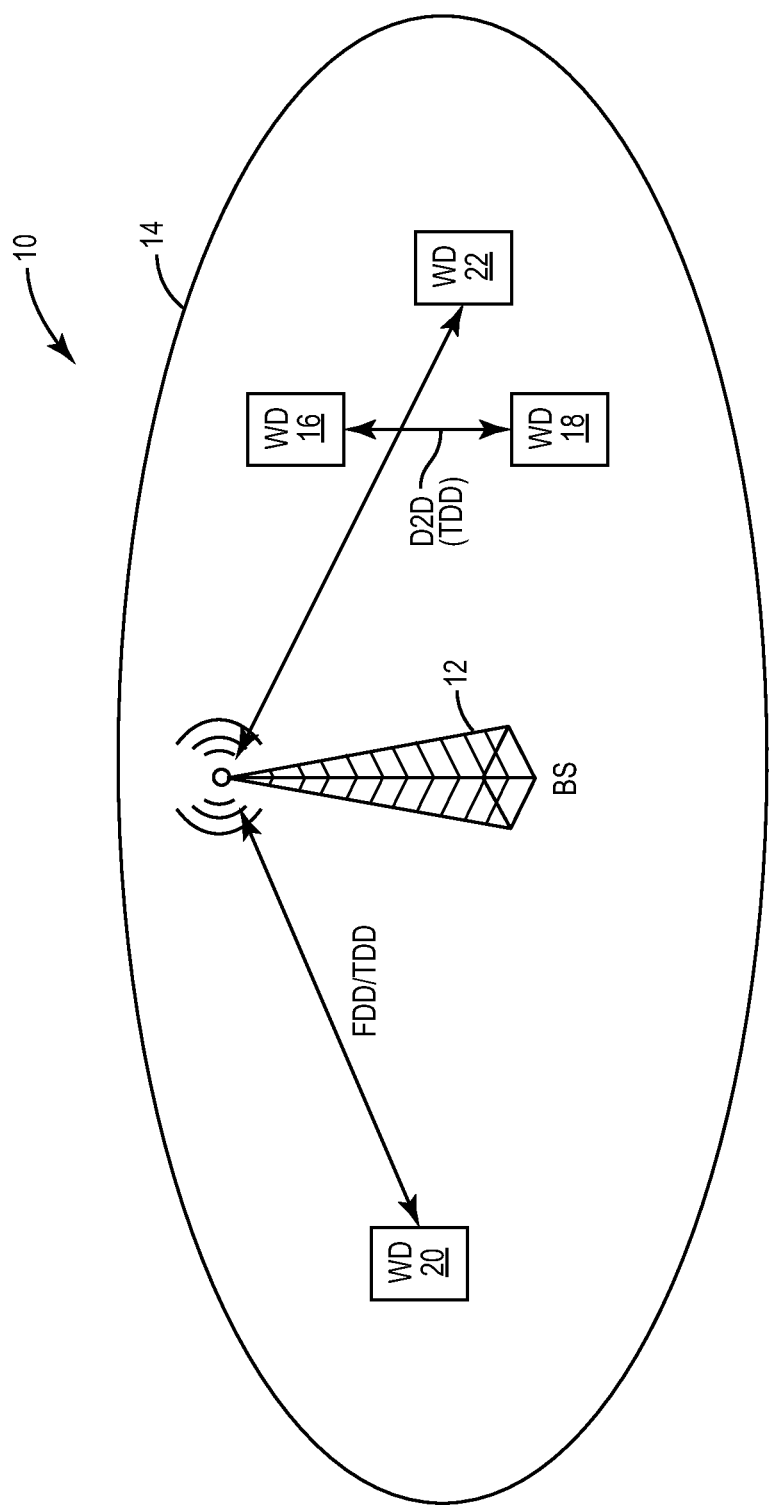
FIG. 1 illustrates a direct device-to-device (D2D) communication link in a cellular communication network.
Figure 2:
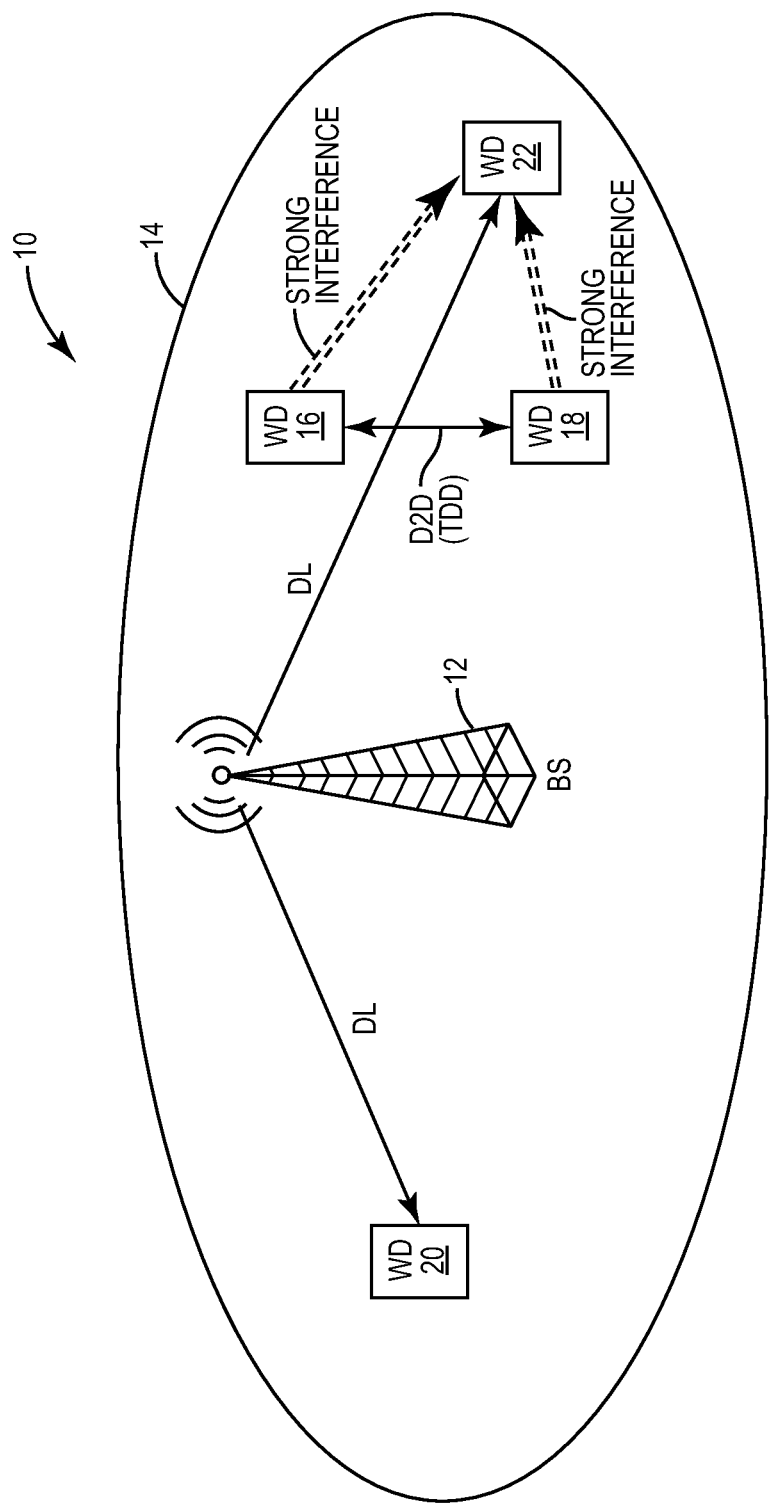
FIG. 2 illustrates a direct D2D communication link that causes strong interference in a downlink from a base station in a cellular communication network.
Figure 3:
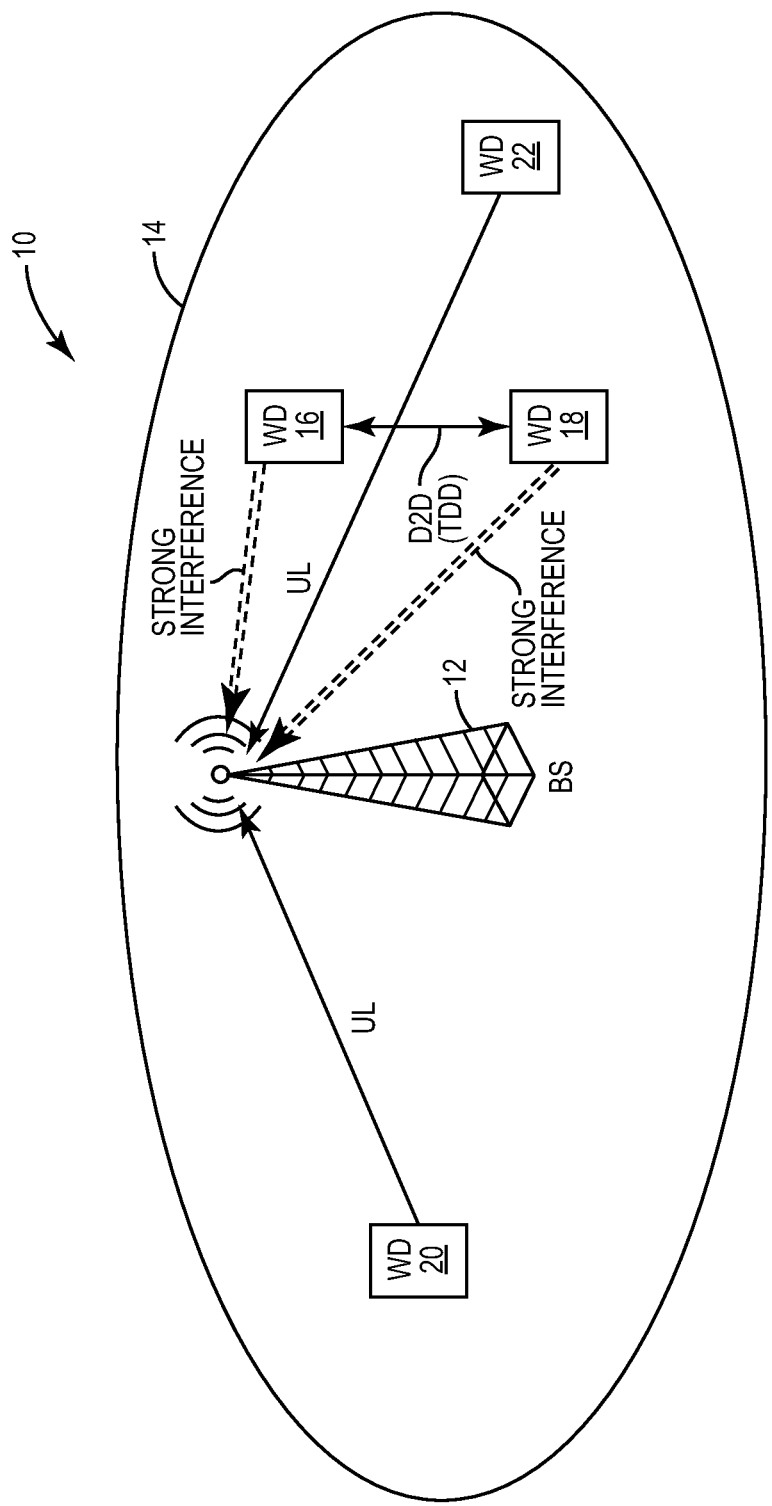
FIG. 3 illustrates a direct D2D communication link that causes strong interference in an uplink from a base station in a cellular communication network.
Figure 4:
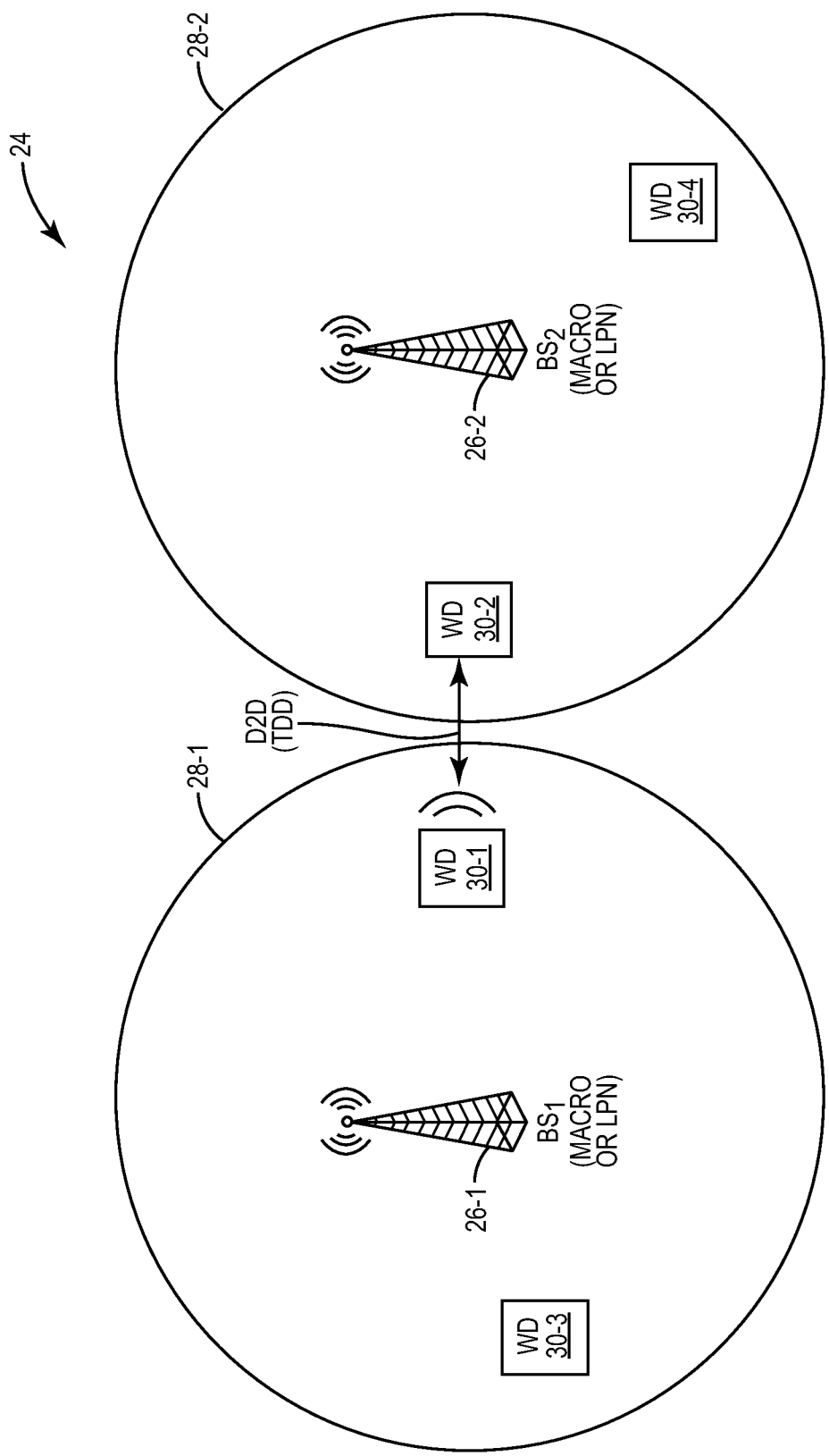
FIG. 4 illustrates a cellular communication network in which a resource for a direct D2D communication link is selected to minimize, or at least substantially reduce, interference according to one embodiment of the present disclosure.

The present disclosure provides systems and methods for selecting a resource for a direct device-to-device (D2D)

communication link between wireless devices in a cellular communication network. In this regard, FIG. 4 illustrates a cellular communication network 24 that selects resources for direct D2D communications according to one embodiment of the present disclosure. As illustrated, the cellular communication network 24 includes base stations 26-1 and 26-2 (generally referred to herein collectively as base stations 26 and individually as base station 26) serving corresponding cells 28-1 and 28-2 (generally referred to herein collectively as cells 28 and individually as cell 28) in the cellular communication network 24. While only two base stations 26 are illustrated for clarity and ease of discussion, the cellular communication network 24 includes numerous base stations 26 serving corresponding cells 28. Each of the base stations 26 is either a macro base station (e.g., an eNB in a Long Term Evolution (LTE) cellular communication network) or a low-power base station (e.g., a pico base station, a Closed Subscriber Group (CSG) Home eNB, or relay in an LTE network).

Notably, the cells 28-1 and 28-2 in FIG. 4 are illustrated as bordering but not overlapping one another. However, if for example the base station 26-1 is a macro base station and the base station 26-2 is a low-power base station, then the cell 28-2 may partially or completely overlap the cell 28-1 (e.g., the cell 28-2 of the low-power base station may be entirely within the cell 28-1 of the macro base station). In this case, any suitable base station selection technique can be used to decide whether a wireless device that is within both the cell 28-1 of the macro base station and the cell 28-2 of the low-power base station is to be served by the macro base station or the low-power base station. For example, the low-power base station may be a CSG Home eNB in an LTE network in which case a wireless device that is in the overlapping area of the cells 28-1 and 28-2 is served by the low-power base station if the wireless device is included in the closed subscriber group; otherwise, the wireless device is served by the macro base station.

The cellular communication network 24 provides service to a number of wireless devices (WDs) 30-1 through 30-4 (generally referred to herein collectively as wireless devices 30 and individually as wireless device 30). Note that while four wireless devices 30 are illustrated for clarity and ease of discussion, the cellular communication network 24 may serve numerous wireless devices 30. In this particular example, the wireless devices 30-1 and 30-3 are within the cell 28-1 of the base station 26-1 and are therefore typically served by the base station 26-1 (i.e., the base station 26-1 is typically the serving base station of the wireless devices 30-1 and 30-3), and the wireless devices 30-2 and 30-4 are within the cell 28-2 of the base station 26-2 and are therefore typically served by the base station 26-2 (i.e., the base station 26-2 is typically the serving base station of the wireless devices 30-2 and 30-4).

In this example, the wireless devices 30-1 and 30-2 are located in the cells 28-1 and 28-2, respectively, and are in close proximity to one another. As used herein, two wireless devices are "in close proximity to one another" for purposes of establishing a direct D2D communication link when the two wireless devices are sufficiently close to form a direct D2D communication link. When the wireless devices 30-1 and 30-2 desire to establish a bearer link, rather than establishing the bearer link through the base stations 26-1 and 26-2, the cellular communication network 24 assists the wireless devices 30-1 and 30-2 to establish a direct D2D communication link (i.e., a direct D2D bearer link) between one another. More specifically, through signaling with the base stations 26-1 and 26-2 or some other mechanism, the wireless devices 30-1 and 30-2 discover one another using a D2D device discovery process and then establish a D2D communication link directly between one another rather than through the base stations 26-1 and 26-2.

The direct D2D communication link between the wireless devices 30-1 and 30-2 is a Time Division Duplex (TDD), or half-duplex, communication link that utilizes either an uplink (UL) resource or a downlink (DL) resource of the cellular communication network 24. As such, there is a loss of orthogonality within the cells 28-1 and 28-2. As used herein, a UL resource is a physical resource utilized by the cellular communication network 24 for uplinks from wireless devices to base stations. In one particular embodiment, the cellular communication network 24 is a Frequency Division Duplexing (FDD) network that utilizes different frequency bands for uplinks and downlinks, and the UL resource is a physical resource in the uplink frequency band. In another embodiment, the cellular communication network 24 is a TDD network that utilizes the same frequency band but different time slots for uplink and downlink, and the UL resource is a physical resource in the uplink time slots. Similarly, a DL resource is a physical resource utilized by the cellular communication network 24 for downlinks from base stations to wireless devices. In one particular embodiment, the cellular communication network 24 is a FDD network that utilizes different frequency bands for uplink and downlink, and the DL resource is a physical resource in the downlink frequency band. In another embodiment, the cellular communication network 24 is a TDD network that utilizes the same frequency band but different time slots for uplink and downlink, and the DL resource is a physical resource in the downlink time slots.

Figure 5:
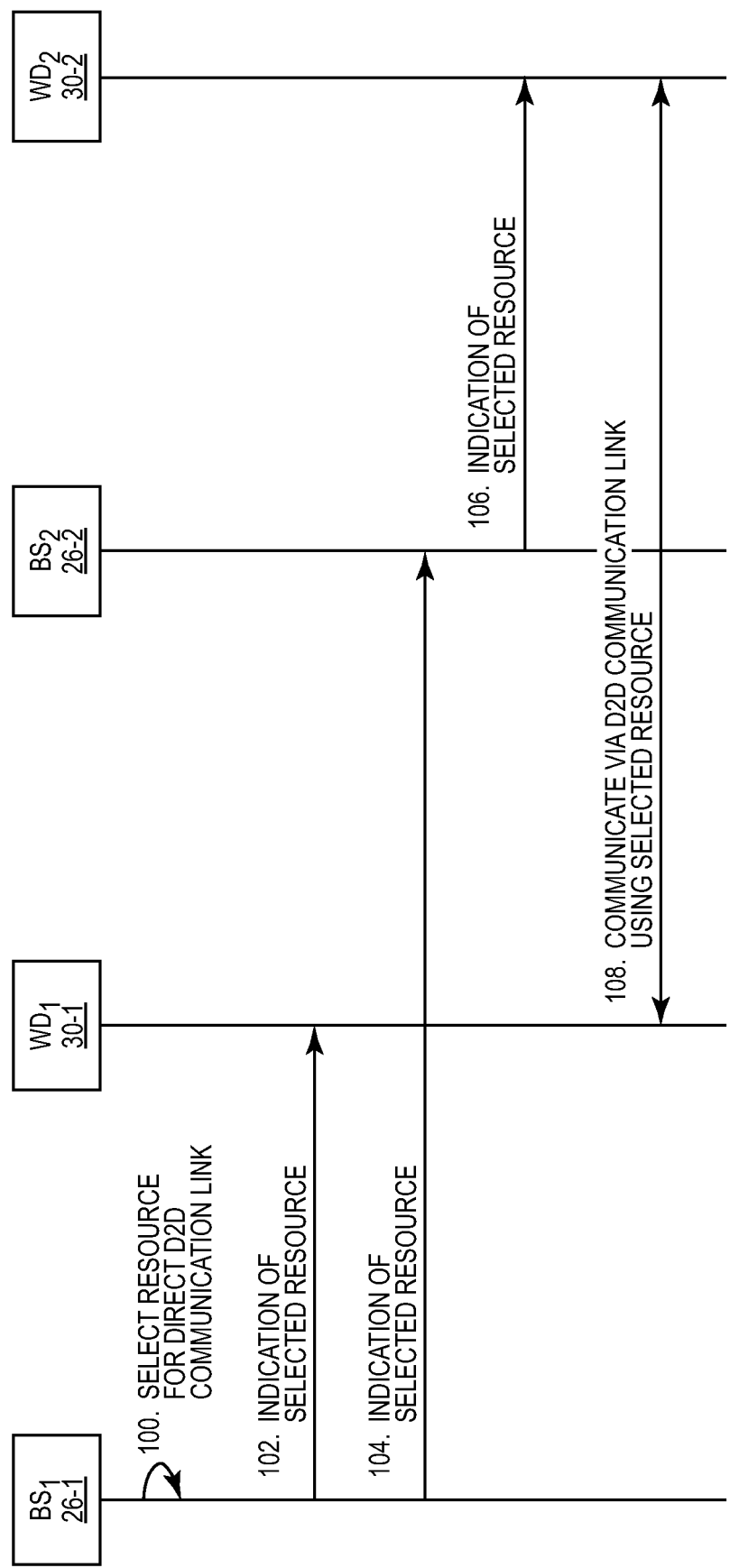
FIG. 5 illustrates the operation of one of the base stations in FIG. 4 to select a resource for a direct D2D communication link according to one embodiment of the present disclosure.

FIG. 5 illustrates the operation of the cellular communication network 24 of FIG. 4 to select a resource for the direct D2D communication link between the wireless devices 30-1 and 30-2 according to one embodiment of the present disclosure. As illustrated, the base station 26-1 selects a resource for the direct D2D communication link between the wireless devices 30-1 and 30-2 (step 100). Notably, while in this example the base station 26-1 selects the resource for the direct D2D communication link, the present disclosure is not limited thereto. The selection process is more generally performed by a control node in the cellular communication network 24, where the control node may be one of the base stations 26-1 and 26-2, one of the wireless devices 30-1 and 30-2, or some other node in the cellular communication network 24.

As discussed below in detail, the resource for the direct D2D communication link between the wireless devices 30-1 and 30-2 is selected based on one or more criteria including a service area type of a service area within the cellular communication network 24 in which the wireless devices 30-1 and 30-2 are located, where the service area type is either homogeneous or heterogeneous. As used herein, a service area is an area within the cellular communication network 24 served by one or more base stations 26, and preferably two or more base stations 26. At one extreme, a service area is the cell 28 of one base station 26. At the other extreme, a service area is an aggregate of all of the cells 28 of all of the base stations 26 in the cellular communication network 24. The service area may alternatively be an aggregate of the cells 28 of two or more neighboring base stations 26. A homogeneous service area is a service area in which all of the base stations 26 in the service area are macro base stations. A heterogeneous service area is a service area in which one or more of the base stations 26 in the service area are low-power base stations and, preferably, one or more of the base stations 26 in the service area are macro base stations. In the case of a heterogeneous service area, special care is taken to protect uplinks to the low-power base stations. Notably, the service area type may alternatively be referred to as a topology (i.e., homogeneous or heterogeneous) of the cellular communication network 24, or a topology (i.e., homogeneous or heterogeneous) of the cellular communication network 24 in a vicinity of the wireless devices 30-1 and 30-2 for the direct D2D communication link.

In addition to the service area type, the selection of the resource for the direct D2D communication link between the wireless devices 30-1 and 30-2 may be based on factors such as, but not limited to, a radio distance between the wireless device 30-1 and the base station 26-1 (i.e., a radio distance between the wireless device 30-1 and the base station 26 that is closest to the wireless device 30-1), a radio distance between the wireless device 30-2 and the base station 26-2 (i.e., a radio distance between the wireless device 30-2 and the base station 26 that is closest to the wireless device 30-2), an indicator as to whether the base station 26-1 is equipped with an interference cancellation receiver, an indicator as to whether the base station 26-2 is equipped with an interference cancellation receiver, and/or an indicator as to whether at least a predefined threshold amount of any other wireless devices 30 that are in proximity to the wireless devices 30-1 and 30-2 are equipped with interference cancellation receivers. Notably, the closest base station 26 to a wireless device 30 is typically, but not necessarily, the serving base station of the wireless device 30. Also, as used herein, an "interference cancellation receiver" is an advanced receiver that is capable of cancelling, or mitigating, a significant amount of interference. In one embodiment, a receiver is an interference cancellation receiver if the receiver can cancel at least 20-25% of the other cell interference. As an example, in LTE, some base stations 26 are equipped with such interference cancellation receivers. Further, in LTE Release 11 and beyond, it will be required for wireless devices (i.e., User Equipment devices (UEs) in LTE terms) to be equipped with such interference cancellation receivers.

In this embodiment, once the resource for the direct D2D communication link is selected, the base station 26-1 communicates an indication of the selected resource to both the wireless device 30-1 and the wireless device 30-2. More specifically, in this embodiment, the base station 26-1 transmits the indication of the selected resource directly to the wireless device 30-1 (step 102). The base station 26-1 also communicates the indication of the selected resource to the wireless device 30-2 indirectly by first transmitting the indication of the selected resource to the base station 26-2 via a core network that interconnects the base stations 26-1 and 26-2 (step 104). The base station 26-2 then transmits the indication of the selected resource to the wireless device 30-2 (step 106). Note that the indication of the selected resource may otherwise be communicated to the wireless devices 30-1 and 30-2. For example, the base station 26-1 may transmit the indication of the selected resource to the wireless device 30-1, which in turn may communicate the indication of the selected resource to the wireless device 30-2. Lastly, the wireless devices 30-1 and 30-2 communicate via the direct D2D communication link using the selected resource (step 108). The resource selected for the direct D2D communication link may thereafter be dynamically updated.

Figure 6:
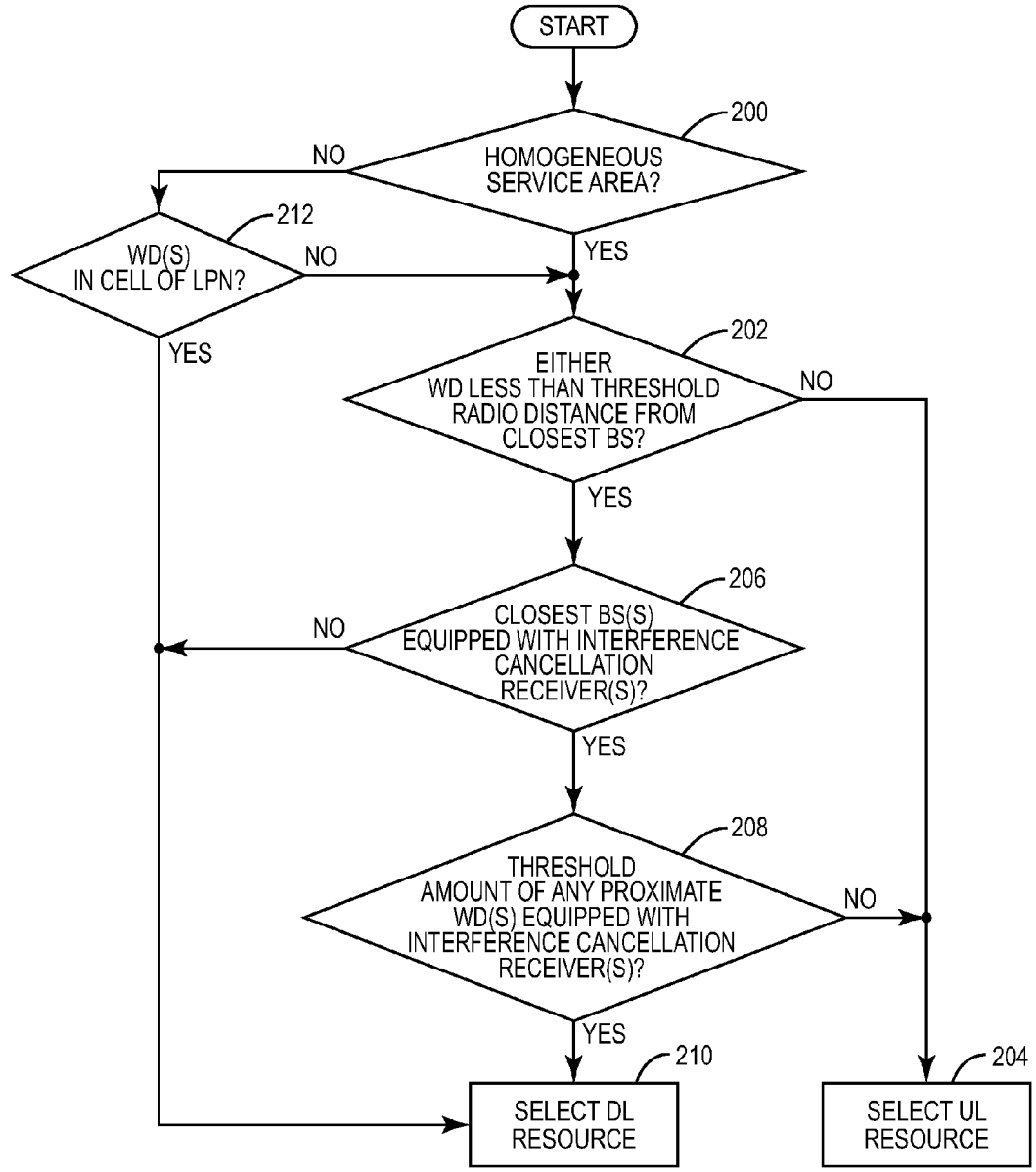
FIG. 6 is a flow chart that illustrates a process for selecting a resource for a direct D2D communication link according to first embodiment of the present disclosure.

FIG. 6 is a flow chart that illustrates a process for selecting a resource for a direct D2D communication link according to a first embodiment of the present disclosure. For this discussion, the direct D2D communication link is the direct D2D communication link between the wireless devices 30-1 and 30-2. This process is performed by a control node, which as discussed above may be one of the base stations 26-1 and 26-2, one of the wireless devices 30-1 and 30-2, or some other node in the cellular communication network 24. In this example, the control node first determines whether the service area in which the wireless devices 30-1 and 30-2 are located is a homogeneous service area (step 200). Information that enables the control node to determine whether the service area is a homogeneous service area can be obtained in any suitable manner. As an example, if the control node is one of the base stations 26-1 and 26-2 and that base station 26 is a macro base station, then the control node is aware of the existence of low-power base stations (e.g., pico base stations, relays, or CSG Home eNBs in LTE). This information may originate either from an Operational and Maintenance (O&M) system or wireless devices, such as but not limited to the wireless devices 30-1 and 30-2. Notably, the wireless devices 30 can detect low-power base stations. While not necessary, for exemplary techniques that may be used by the wireless devices 30 to detect low-power base stations, the interested reader is directed to U.S. patent application Ser. No. 13/327,486, filed Dec. 15, 2011, entitled "METHOD AND APPARATUS FOR REDUCING INTER-CELL INTERFERENCE" and U.S. patent application Ser. No. 13/454,857, filed Apr. 24, 2012, entitled "METHODS AND DEVICES FOR ADJUSTING RESOURCE MANAGEMENT PROCEDURES IN HETEROGENEOUS COMMUNICATION NETWORKS BASED ON CELL INFORMATION," which are commonly owned and assigned and are hereby incorporated herein by reference for their teachings regarding the detection of low-power base stations.

If the wireless devices 30-1 and 30-2 are located in a homogeneous service area, the control node then determines whether either of the wireless devices 30-1 and 30-2 is less than a predefined threshold radio distance from its closest base station 26 (step 202). In other words, the control node determines whether either a radio distance between the wireless device 30-1 and the base station 26 closest to the wireless device 30-1 is less than a predefined threshold radio distance or a radio distance between the wireless device 30-2 and the base station 26 closest to the wireless device 30-2 is less than a predefined threshold radio distance. As used herein, a radio distance is a term that represents a link quality between two nodes rather than a Euclidean distance between the two nodes. The greater the radio distance, the lower the link quality. For example, radio distance may be represented as a Reference Signal Received Power (RSRP) value such as that measured by a wireless device in an LTE cellular communication network, a Reference Signal Received Quality (RSRQ) value such as that measured by a wireless device in an LTE cellular communication network, a Channel Quality Index (CQI) value such as that measured by a wireless device in an LTE cellular communication network, a Received Signal Strength Indicator (RSSI) value measured by the wireless device 30 for a signal transmitted from the base station 26 to the wireless device 30, Channel State Information (CSI) such as that generated a wireless device in an LTE network, an Uplink Sounding Reference Signal (UL SRS) transmitted by the wireless device 30, a Signal to Interference plus Noise Ratio (SINR) value, or the like, or any combination thereof.

In this example, the closest base station 26 to the wireless device 30-1 is the base station 26-1, and the closest base station 26 to the wireless device 30-2 is the base station 26-2. As such, the control node determines whether the radio distance between the wireless device 30-1 and the base station 26-1 is less than a predefined threshold radio distance or the radio distance between the wireless device 30-2 and the base station 26-2 is less than a predefined threshold radio distance. In one particular example, the control node determines whether an RSRP value measured by the wireless device 30-1 for the base station 26-1 is greater than or equal to a predefined threshold RSRP value. If so, the radio distance between the wireless device 30-1 and the base station 26-1 is less than a predefined threshold radio distance; otherwise, it is not. Likewise, the control node determines whether an RSRP value measured by the wireless device 30-2 for the base station 26-2 is greater than or equal to a predefined threshold RSRP value. If so, the radio distance between the wireless device 30-2 and the base station 26-2 is less than a predefined threshold radio distance; otherwise, it is not. In one implementation, step 202 may be implemented as "MAX$\{RSRP_i\}$>$RSRP_{THRESHOLD}$?", where "i" is an index for the wireless devices 30-1 and 30-2. So, in other words, a determination is made as to whether the maximum RSRP value for the two wireless devices 30-1 and 30-2 is greater a predefined RSRP threshold value ($RSRP_{THRESHOLD}$). Notably, the predefined threshold radio distance is preferably the same for all macro base stations. However, in an alternative embodiment, the threshold radio distance may be different for different macro base stations.

If neither of the wireless devices 30-1 and 30-2 is less than the predefined threshold radio distance from its closest base station 26, the control node selects a UL resource of the cellular communication network 24 as the resource for the direct D2D communication link (step 204). Otherwise, if one or both of the wireless devices 30-1 and 30-2 is less than the predefined threshold radio distance from its closest base station 26, the control node determines whether the closest base station(s) 26 is(are) equipped with an interference cancellation receiver (step 206). More specifically, if in step 202 the control node determines that the wireless device 30-1 is less than the predefined threshold radio distance from its closest base station 26, which in this example in the base station 26-1, then the control node determines whether the closest base station 26 of the wireless device 30-1 is equipped with an interference cancellation receiver. Likewise, if in step 202 the control node determines that the wireless device 30-2 is less than the predefined threshold radio distance from its closest base station 26, which in this example in the base station 26-2, then the control node determines whether the closest base station 26 of the wireless device 30-2 is equipped with an interference cancellation receiver.

If the decision in step 206 is negative, the process proceeds to step 210 where, as discussed below, a DL resource of the cellular communication network 24 is selected as the resource for the direct D2D communication link between the wireless devices 30-1 and 30-2. Otherwise, if the decision in step 206 is positive, the control node determines whether at least a predefined threshold amount of any other wireless devices 30 that are in proximity to the wireless devices 30-1 and 30-2 are equipped with an interference cancellation receiver (step 208). Here, "in proximity to" means less than a predefined threshold distance or a predefined threshold radio distance from either the wireless device 30-1 or the wireless device 30-2. Preferably, this predefined threshold distance or predefined threshold radio distance is defined such that transmissions over the direct D2D communication link would cause a significant amount of interference to other wireless devices 30 that are within this predefined threshold distance or predefined threshold radio distance from either the wireless device 30-1 or the wireless device 30-2.

If less than the predefined threshold amount of any other wireless devices 30 that are in proximity to the wireless devices 30-1 and 30-2 are equipped with an interference cancellation receiver, the control node proceeds to step 204 where the UL resource is selected. Otherwise, if at least the predefined threshold amount of any other wireless devices 30 that are in proximity to the wireless devices 30-1 and 30-2 are equipped with an interference cancellation receiver (which includes the scenario where there are no other wireless devices 30 in proximity to the wireless devices 30-1 and 30-2), the control node selects a DL resource of the cellular communication network 24 as the resource for the direct D2D communication link between the wireless devices 30-1 and 30-2 (step 210).

Returning to step 200, if the service area is a heterogeneous service area, the control node determines whether either of the wireless devices 30-1 and 30-2 is located in a cell 28 of a low-power base station (step 212). In other words, in this example, the control node determines whether either the base station 26-1 or the base station 26-2 is a low-power base station. If not, the process proceeds to step 202 and continues in the manner described above. Otherwise, if either of the wireless devices 30-1 and 30-2 is in the cell 28 of a low-power base station, the control node proceeds to step 210 where the DL resource is selected. This process may be repeated as desired to dynamically update the resource selected for the direct D2D communication link between the wireless devices 30-1 and 30-2.

Before proceeding, it should be noted that the steps illustrated in FIG. 6 are not necessarily limited to being performed in any particular order. It should also be noted that, in one alternative embodiment, steps 200 and 212 may be implemented as a single step. More specifically, step 212 may be merged into step 200 such that the control node determines that the service area is a heterogeneous service area if either of the wireless devices 30-1 and 30-2 is in the cell 28 of a low-power base station and otherwise assumes (or proceeds as if) the service area is a homogeneous service area.

Figure 7:
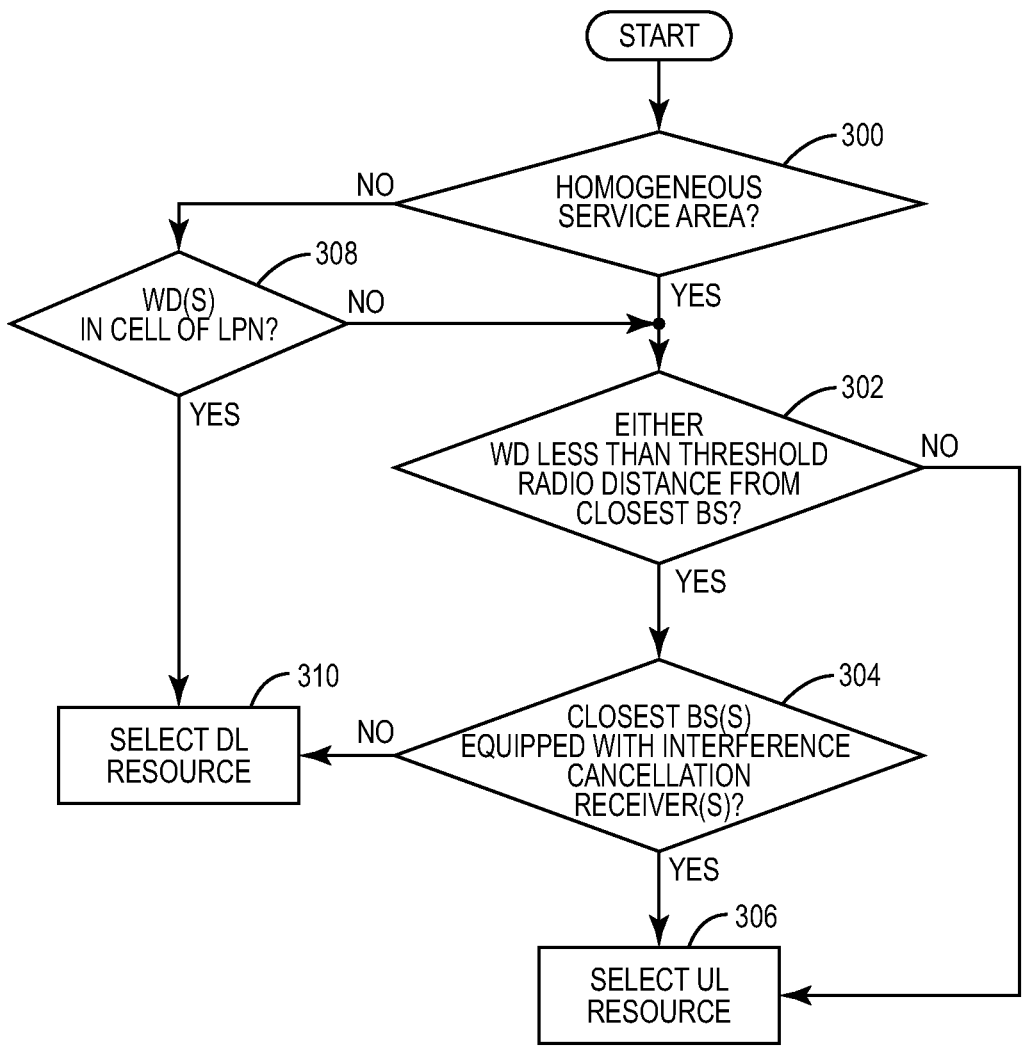
FIG. 7 is a flow chart that illustrates a process for selecting a resource for a direct D2D communication link according to a second embodiment of the present disclosure.

FIG. 7 is a flow chart that illustrates a process for selecting a resource for a direct D2D communication link according to a second embodiment of the present disclosure. In general, this process is the same as that in FIG. 6 but where step 208 has been omitted. This may be beneficial where, for example, such information is not available to the control node. More specifically, for this discussion, the direct D2D communication link is the direct D2D communication link between the wireless devices 30-1 and 30-2. In this example, the control node first determines whether the service area in which the wireless devices 30-1 and 30-2 are located is a homogeneous service area (step 300). If the wireless devices 30-1 and 30-2 are located in a homogeneous service area, the control node then determines whether either of the wireless devices 30-1 and 30-2 is less than a predefined threshold radio distance from its closest base station 26 (step 302). In this example, the closest base station 26 to the wireless device 30-1 is the base station 26-1, and the closest base station 26 to the wireless device 30-2 is the base station 26-2. As such, the control node determines whether the wireless device 30-1 is less than a predefined threshold radio distance from the base station 26-1 or the wireless device 30-2 is less than a predefined threshold radio distance from the base station 26-2.

If neither of the wireless devices 30-1 and 30-2 is less than the predefined threshold radio distance from its closest base station 26, the control node proceeds to step 306 where the control node selects a UL resource of the cellular communication network 24 as the resource for the direct D2D communication link. Otherwise, if one or both of the wireless devices 30-1 and 30-2 is less than the predefined threshold radio distance from its closest base station 26, the control node determines whether the closest base station(s) 26 is (are) equipped with an interference cancellation receiver (step 304). More specifically, if in step 302 the control node determines that the wireless device 30-1 is less than the predefined threshold radio distance from its closest base station 26, which in this example is the base station 26-1, the control node determines whether the base station 26 closest to the wireless device 26-1 is equipped with an interference cancellation receiver. Likewise, if in step 302 the control node determines that the wireless device 30-2 is less than the predefined threshold radio distance from its closest base station 26, which in this example is the base station 26-2, the control node determines whether the base station 26 closest to the wireless device 30-2 is equipped with an interference cancellation receiver.

If the decision in step 304 is negative, the process proceeds to step 310 where, as discussed below, a DL resource of the cellular communication network 24 is selected as the resource for the direct D2D communication link between the wireless devices 30-1 and 30-2. Otherwise, if the decision in step 304 is positive, the control node selects the UL resource as the resource for the direct D2D communication link between the wireless devices 30-1 and 30-2 (step 306).

Returning to step 300, if the service area is a heterogeneous service area, the control node determines whether either of the wireless devices 30-1 and 30-2 is located in the cell 28 of a low-power base station (step 308). In other words, in this example, the control node determines whether either the base station 26-1 or the base station 26-2 is a low-power base station. If not, the process proceeds to step 302 and continues in the manner described above. Otherwise, if either of the wireless devices 30-1 and 30-2 is in the cell 28 of a low-power base station, the control node selects the DL resource as the resource for the direct D2D communication link between the wireless devices 30-1 and 30-2 (step 310).

Before proceeding, it should be noted that the steps illustrated in FIG. 7 are not necessarily limited to being performed in any particular order. It should also be noted that, in one alternative embodiment, step 300 is omitted and the process begins at step 308. In yet another embodiment, steps 300 and 308 may be implemented as a single step. More specifically, step 308 may be merged into step 300 such that the control node determines that the service area is a heterogeneous service area if either of the wireless devices 30-1 and 30-2 is in the cell 28 of a low-power base station and otherwise assumes (or proceeds as if) the service area is a homogeneous service area.

Figure 8:
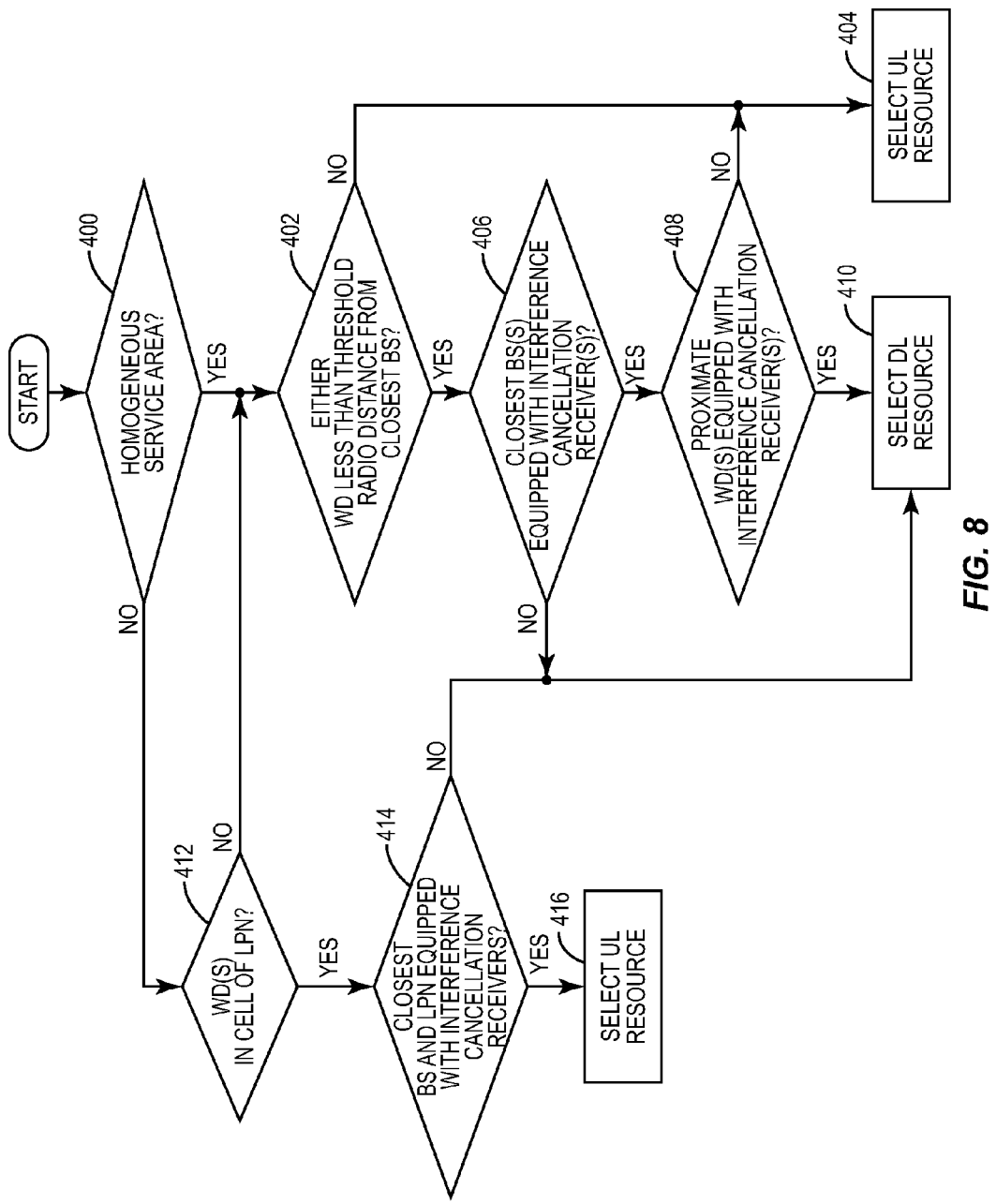
FIG. 8 is a flow chart that illustrates a process for selecting a resource for a direct D2D communication link according to a third embodiment of the present disclosure.

FIG. 8 is a flow chart that illustrates a process for selecting a resource for a direct D2D communication link according to a third embodiment of the present disclosure. In general, this process is the same as that in FIG. 6 but where a receiver type of the involved base station(s) is(are) also taken into account if the service area is a heterogeneous service area. More specifically, steps 400 through 412 are the same as steps 200 through 212 of FIG. 6 and, therefore, a discussion of steps 400 through 412 is not repeated. In this embodiment, if the control node determines in step 412 that either of the wireless devices 30-1 and 30-2 is located in the cell 28 of a low-power base station, the control node then determines whether: (1) the low-power base station(s) that serve the cell(s) 28 in which either of the wireless devices 30-1 and 30-2 is(are) located is(are) equipped with an interference cancellation receiver and (2) any macro base station that is within the predefined threshold radio distance from either of the wireless devices 30-1 and 30-2 is equipped with an interference cancellation receiver (step 414). So, for example, if the base station 26-1 is a macro base station that is less than the predefined threshold radio distance from the wireless device 30-1 and the base station 26-2 is a low-power base station, then the control node determines whether: (1) the macro base station (i.e., the base station 26-1) is equipped with an interference cancellation receiver and (2) the low-power base station (i.e., the base station 26-2) is equipped with an interference cancellation receiver. If the decision in step 414 is negative, the control node proceeds to step 410 where the DL resource is selected. Otherwise, if the decision in step 414 is positive, the control node selects a UL resource of the cellular communication network 24 as the resource for the direct D2D communication link between the wireless devices 30-1 and 30-2 (step 416).

Figure 9:
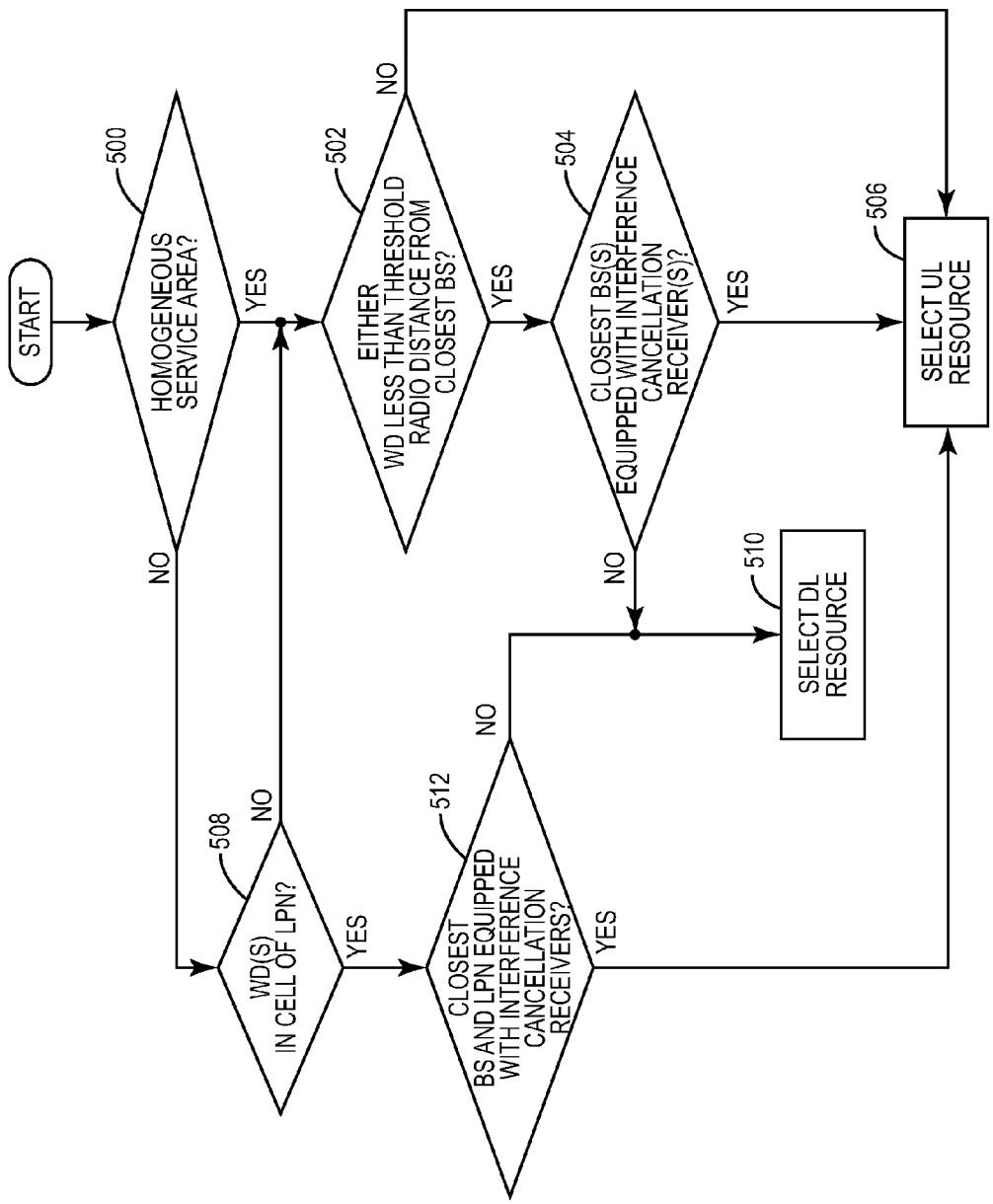
FIG. 9 is a flow chart that illustrates a process for selecting a resource for a direct D2D communication link according to a fourth embodiment of the present disclosure.

FIG. 9 is a flow chart that illustrates a process for selecting a resource for a direct D2D communication link according to a fourth embodiment of the present disclosure. In general, this process is the same as that in FIG. 7 but where a receiver type of the involved base station(s) is(are) also taken into account if the service area is a heterogeneous service area in the same manner as described above with respect to FIG. 8. More specifically, steps 500 through 510 are the same as steps 300 through 310 in FIG. 7 and, therefore, a discussion of steps 500 through 510 is not repeated. In this embodiment, if the control node determines in step 508 that either of the wireless devices 30-1 and 30-2 is located in the cell 28 of a low-power base station, the control node then determines whether: (1) the low-power base station(s) that serve the cell(s) 28 in which either of the wireless devices 30-1 and 30-2 is(are) located is(are) equipped with an interference cancellation receiver and (2) any macro base station that is within the predefined threshold radio distance from either of the wireless devices 30-1 and 30-2 is equipped with an interference cancellation receiver (step 512). If the decision in step 512 is negative, the control node proceeds to step 510 where the DL resource is selected. Otherwise, if the decision in step 512 is positive, the control node proceeds to step 506 where the UL resource is selected.

Figure 10:
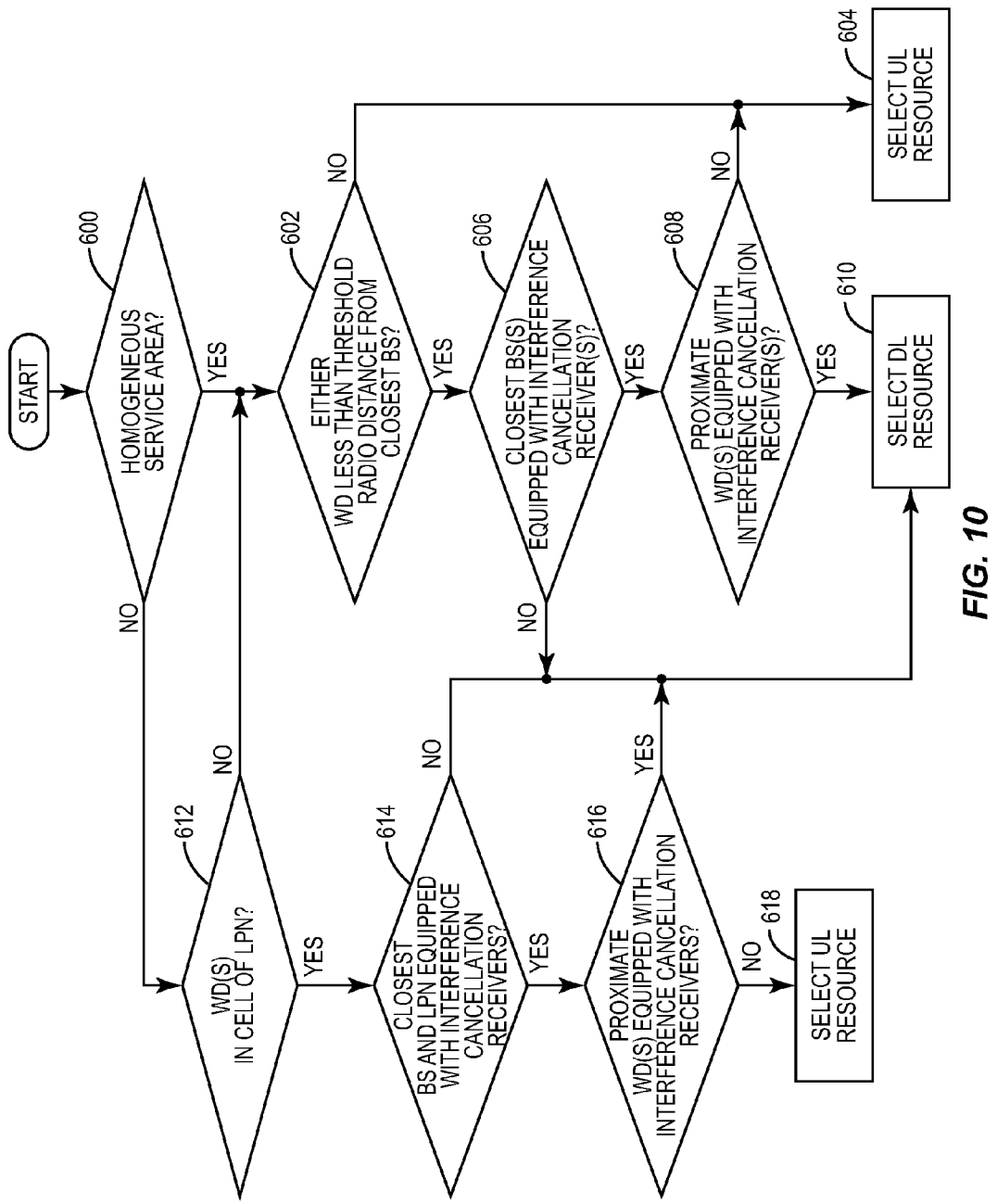
FIG. 10 is a flow chart that illustrates a process for selecting a resource for a direct D2D communication link according to a fifth embodiment of the present disclosure.

FIG. 10 is a flow chart that illustrates a process for selecting a resource for a direct D2D communication link according to a fifth embodiment of the present disclosure. In general, this process is the same as that in FIG. 8 but where a receiver type of any other wireless devices 30 that are in proximity to the wireless devices 30-1 and 30-2 is also taken into account if the service area is a heterogeneous service area. More specifically, steps 600 through 614 are the same as steps 400 through 414 in FIG. 8 and, therefore, a discussion of steps 600 through 614 is not repeated. In this embodiment, if the decision in step 614 is positive, the control node determines whether at least a predefined threshold amount of any other wireless devices 30 that are in proximity to the wireless devices 30-1 and 30-2 are equipped with an interference cancellation receiver in a manner similar to that described above with respect to step 208 of FIG. 6 (step 616). If not, the control node proceeds to step 610 where the UL resource is selected. Otherwise, the control node selects the UL resource of the cellular communication network 24 as the resource for the direct D2D communication link between the wireless devices 30-1 and 30-2 (step 618).

It should also be noted that the decision in step 202 in FIG. 6 (and its equivalents in FIGS. 7 through 10) is different than the decision in step 212 in FIG. 6 (and its equivalents in FIGS. 7 through 10) in that, in actual practice, step 202 may only compare the smallest radio distance of the radio distances between the wireless devices 30-1 and 30-2 and their closest base stations 26 to the predefined threshold radio distance. In contrast, step 212 should check both wireless devices 30-1 and 30-2 to determine whether either or both of them are in the cell 28 of a low-power base station. This difference comes from the fact that within a heterogeneous service area, selection of the UL resource for the direct D2D communication link might generate uplink interference to both of the base stations 26 in the area, which for this example are the base stations 26-1 and 26-2. As an example, consider again the scenario of FIG. 4 where both of the base stations 26-1 and 26-2 are macro base stations and the base station 26-1 is equipped with one or more interference cancellation receivers. Assume also that the radio distance between the wireless device 30-1 and the base station 26-1 is less than the distance between the wireless device 30-2 and the base station 26-2. In a homogeneous service area, the uplink intra-cell interference at the base station 26-1 generated by transmissions from the wireless device 30-1 on the direct D2D communication link can be insignificant. The same is true for the uplink inter-cell interference at the base station 26-2 resulting from transmissions from the wireless device 30-2 on the direct D2D communication link. In the same manner, the uplink intra-cell interference at the base station 26-2 generated by transmissions from the wireless device 30-2 on the direct D2D communication link is small, and the same applies for uplink inter cell interference at the base station 26-2 generated by transmissions from the wireless device 30-1 on the direct D2D communication link. Hence, the UL resource is selected for the direct D2D communication link according to step 204.

Conversely, if the service area is a heterogeneous service area, the situation is not the same. Consider the scenario of FIG. 4, where the base station 26-1 is a macro base station and the base station 26-2 is a low-power base station. Also assume that the radio distance between the base station 26-1 and the wireless device 30-1 is smaller than the radio distance between the base station 26-2 and the wireless device 30-2. Lastly assume that the base station 26-1 is equipped with one or more interference cancellation receivers whilst the base station 26-2 is not equipped with an interference cancellation receiver. In this case, selecting a UL resource for the direct D2D communication link may not be the optimal choice. Very likely, transmissions from the wireless device 30-2, and possibly transmissions from the wireless device 30-1, would cause significant interference at the base station 26-2 due to the small cell size of the cell 28 of the base station 26-2. Therefore, it may be beneficial to check a receiver type of the base station 26-2 as is done in steps 414, 512, and 614 of FIGS. 8, 9 and 10, respectively. If the base station 26-2 is not equipped with an interference cancellation receiver, then a DL resource is selected so as to avoid the risk of polluting the cell 28 of the base station 26-2 with uplink interference. Moreover, by selecting the DL resource, wireless devices 30 in the cells 28-1 and 28-2 are protected since they are close to their serving base stations 26-1 and 26-2, respectively.

In the scenario of the heterogeneous service area discussed above, if both of the base stations 26-1 and 26-2 can effectively cancel interference (i.e., if the answer to the check of step 614 of FIG. 10 is yes), then in the embodiment of FIG. 10 the control node checks if at least the predefined threshold amount of any other wireless devices 30 in proximity to the wireless devices 30-1 and 30-2 are equipped with interference cancellation receivers in step 616. For example, for LTE, the $3^{rd}$ Generation Partnership Project (3GPP) has decided that advanced receivers capable of cancelling a significant amount of interference (i.e., interference cancellation receivers) are going to be mandatory for UEs in Release 11 and beyond. The control node may then use the release of the wireless devices 30 to determine whether the wireless devices 30 are equipped with interference cancellation receivers. For releases prior to Release 11 (e.g., Release 10), the wireless devices 30 may or may not be equipped with interference cancellation receivers. In that case, those wireless devices 30 may notify the cellular communication network 24, and in particular the control node, of their receiver type or the cellular communication network 24 may detect their receiver type by, for example, comparing different types of measurements given by the wireless devices 30 (such as suggested in commonly assigned Patent Cooperation Treaty Application Serial No. PCT/SE2011/051272, filed Oct. 26, 2011, entitled "A METHOD AND A NETWORK NODE FOR DETERMINING AN INDICATION OF INTERFERENCE MITIGATION," the disclosure of which is hereby incorporated herein by reference). The receiver type of the wireless devices 30 is available at both of the base stations 26-1 and 26-2 and can be shared between them. If less than the predefined threshold amount of the wireless devices 30 in proximity to the wireless devices 30-1 and 30-2 are equipped with interference cancellation receivers, then it is of higher priority to protect the vulnerable downlink from interference and therefore the UL resource is selected. In the opposite case where at least the threshold amount of the wireless devices 30 in proximity to the wireless devices 30-1 and 30-2 are equipped with interference cancellation receivers, then both uplink and downlink are equally protected from interference from the direct D2D communication link and hence the DL resource is selected.

Figure 11:
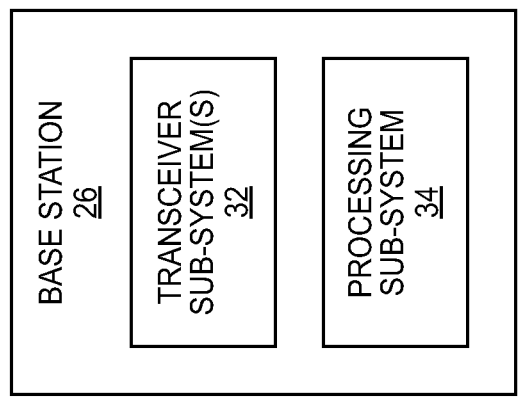
FIG. 11 is a block diagram of a base station according to one embodiment of the present disclosure.

FIG. 11 is a block diagram of one of the base stations 26 of FIG. 4 according to one embodiment of the present disclosure. The base station 26 includes one or more transceiver sub-systems 32 and a processing sub-system 34. At least one of the transceiver sub-systems 32 generally includes analog and, in some embodiments, digital components for wirelessly sending and receiving messages to and from the wireless devices 30 in the cellular communication network 24. In particular embodiments, the transceiver sub-systems 32 may represent or include radio-frequency (RF) transceivers, or separate RF transmitters and receivers, capable of transmitting such messages and/or other suitable information wirelessly to the wireless devices 30.

The processing sub-system 34 is implemented in hardware or a combination of hardware and software. In general, the processing sub-system 34 operates to communicate with the wireless devices 30 and potentially other base stations 26 via the transceiver sub-system(s) 32 to perform the D2D resource selection process described herein. In particular embodiments, the processing sub-system 34 may comprise, for example, one or several general-purpose or special-purpose microprocessors or other microcontrollers programmed with suitable software and/or firmware to carry out some or all of the functionality of the base station 26 described herein. In addition or alternatively, the processing sub-system 34 may comprise various digital hardware blocks (e.g., one or more Application Specific Integrated Circuits (ASICs), one or more off-the-shelf digital and analog hardware components, or a combination thereof) configured to carry out some or all of the functionality of the base station 26 described herein. Additionally, in particular embodiments, the above described functionality of base station 26 may be implemented, in whole or in part, by the processing sub-system 34 executing software or other instructions stored on a non-transitory computer-readable medium, such as random access memory (RAM), read only memory (ROM), a magnetic storage device, an optical storage device, or any other suitable type of data storage components.

Figure 12:
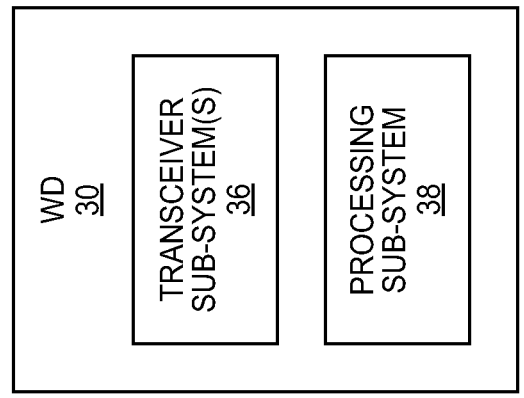
FIG. 12 is a block diagram of a wireless device according to one embodiment of the present disclosure.

FIG. 12 is a block diagram of one of the wireless devices 30 according to one embodiment of the present disclosure. The wireless device 30 includes one or more transceiver sub-systems 36 and a processing sub-system 38. At least one of the transceiver sub-systems 36 generally includes analog and, in some embodiments, digital components for wirelessly sending and receiving messages to and from the base stations 26 or other wireless devices 30 in the cellular communication network 24. In particular embodiments, the transceiver sub-systems 36 may represent or include RF transceivers, or separate RF transmitters and receivers, capable of transmitting such messages and/or other suitable information wirelessly to the base stations 26 or other wireless devices 30.

The processing sub-system 38 is implemented in hardware or a combination of hardware and software. In general, the processing sub-system 38 enables the wireless device 30 to perform the functions of the wireless device 30 described herein. In particular embodiments, the processing sub-system 38 may comprise, for example, one or several general-purpose or special-purpose microprocessors or other microcontrollers programmed with suitable software and/or firmware to carry out some or all of the functionality of the wireless device 30 described herein. In addition or alternatively, the processing sub-system 38 may comprise various digital hardware blocks (e.g., one or more ASICs, one or more off-the-shelf digital and analog hardware components, or a combination thereof) configured to carry out some or all of the functionality of the wireless device 30 described herein. Additionally, in particular embodiments, the above described functionality of the wireless devices 30 may be implemented, in whole or in part, by the processing sub-system 38 executing software or other instructions stored on a non-transitory computer-readable medium, such as RAM, ROM, a magnetic storage device, an optical storage device, or any other suitable type of data storage components.

The following acronyms are used throughout this disclosure.

3GPP 3rd Generation Partnership Project
ASIC Application Specific Integrated Circuit
CQI Channel Quality Index
CSG Closed Subscriber Group
CSI Channel State Information
D2D Device-to-Device
DL Downlink
FDD Frequency Division Duplex
LTE Long Term Evolution
O & M Operational and Maintenance
OFDM Orthogonal Frequency Division Multiplexing
RAM Random Access Memory
RF Radio Frequency
ROM Read Only Memory
RSRP Reference Signal Received Power
RSRQ Reference Signal Received Quality
RSSI Received Signal Strength Indicator
SINR Signal to Interference Plus Noise Ratio
TDD Time Division Duplex
UE User Equipment Device
UL Uplink
UL SRS Uplink Sounding Reference Signal
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A method of operation of a control node in a cellular communication network comprising:
    selecting a resource for a direct device-to-device communication link between a first wireless device and a second wireless device in the cellular communication network based on a plurality of criteria comprising a service area type for a service area within the cellular communication network in which the first wireless device and the second wireless device are located, wherein the service area type for the service area is one of a group consisting of: a homogeneous service area in which all base stations in the service area are macro base stations, and a heterogeneous service area in which one or more base stations in the service area are low-power base stations; and
    communicating an indicator of the resource selected for the direct device-to-device communication link to at least one of the first wireless device and the second wireless device.

2. The method of claim 1 wherein the plurality of criteria further comprise at least one of a group consisting of: a radio distance between the first wireless device and a base station closest to the first wireless device and a radio distance between the second wireless device and a base station closest to the second wireless device.

3. The method of claim 2 wherein the plurality of criteria further comprise at least one of a group consisting of: an indicator of whether the base station closest to the first wireless device is equipped with an interference cancellation receiver and an indicator of whether the base station closest to the second wireless device is equipped with an interference cancellation receiver.

4. The method of claim 3 wherein the plurality of criteria further comprise an indicator of whether at least a threshold amount of one or more additional wireless devices located in proximity to the first and second wireless devices are equipped with an interference cancellation receiver.

5. The method of claim 1 wherein selecting the resource for the direct device-to-device communication link between the first wireless device and the second wireless device in the cellular communication network comprises selecting either an uplink resource or a downlink resource of the cellular communication network as the resource for the direct device-to-device communication link between the first wireless device and the second wireless device in the cellular communication network based on the plurality of criteria.

6. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a homogeneous service area;

determining that a radio distance between the first wireless device and a base station closest to the first wireless device is greater than a predefined threshold radio distance and a radio distance between the second wireless device and a base station closest to the second wireless device is greater than a predefined threshold radio distance; and in response, selecting an uplink resource of the cellular communication network as the resource for the direct device-to-device communication link between the first wireless device and the second wireless device.

7. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a homogeneous service area;

determining that either a radio distance between the first wireless device and a base station closest to the first wireless device is less than a predefined threshold radio distance or a radio distance between the second wireless device and a base station closest to the second wireless device is less than a predefined threshold radio distance;

for at least one wireless device of the first wireless device and the second wireless device for which the radio distance between the at least one wireless device and the base station closest to the at least one wireless device is determined to be less than a predefined threshold radio distance, determining that the base station closest to the at least one wireless device is not equipped with an interference cancellation receiver; and in response, selecting a downlink resource of the cellular communication network as the resource for the direct device-to-device communication link between the first wireless device and the second wireless device.

8. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a homogeneous service area;

determining that either a radio distance between the first wireless device and a base station closest to the first wireless device is less than a predefined threshold radio distance or a radio distance between the second wireless device and a base station closest to the second wireless device is less than a predefined threshold radio distance;

for each wireless device of the first wireless device and the second wireless device for which the radio distance between the wireless device and the base station closest to the wireless device is determined to be less than a predefined threshold radio distance, determining that the base station closest to the wireless device is equipped with an interference cancellation receiver;

determining that at least a predefined threshold amount of one or more additional wireless devices that are proximate to the first and second wireless devices are equipped with interference cancellation receivers; and in response, selecting a downlink resource of the cellular communication network as the resource for the direct device-to-device communication link between the first wireless device and the second wireless device.

9. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a homogeneous service area;

determining that either a radio distance between the first wireless device and a base station closest to the first wireless device is less than a predefined threshold radio distance or a radio distance between the second wireless device and a base station closest to the second wireless device is less than a predefined threshold radio distance;

for each wireless device of the first wireless device and the second wireless device for which the radio distance between the wireless device and the base station closest to the wireless device is determined to be less than a predefined threshold radio distance, determining that the closest base station to the wireless device is equipped with an interference cancellation receiver;

determining that less than a predefined threshold amount of one or more additional wireless devices that are proximate to the first and second wireless devices are equipped with interference cancellation receivers; and in response, selecting an uplink resource of the cellular communication network as the resource for the direct device-to-device communication link between the first wireless device and the second wireless device.

10. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a heterogeneous service area;

determining that at least one of the first wireless device and the second wireless device is within a cell of a low power base station; and in response, selecting a downlink resource of the cellular communication network as the resource for the direct device-to-device communication link between the first wireless device and the second wireless device.

11. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a heterogeneous service area;

determining that neither of the first wireless device and the second wireless device is within a cell of a low power base station;

determining that a radio distance between the first wireless device and a base station closest to the first wireless device is greater than a predefined threshold radio distance and a radio distance between the second wireless device and a base station closest to the second wireless device is greater than a predefined threshold radio distance; and in response, selecting an uplink resource of the cellular communication network as the resource for the direct device-to-device communication link between the first wireless device and the second wireless device.

12. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a heterogeneous service area;

determining that neither of the first wireless device and the second wireless device is within a cell of a low power base station;

determining that either a radio distance between the first wireless device and a base station closest to the first wireless device is less than a predefined threshold radio distance or a radio distance between the second wireless device and a base station closest to the second wireless device is less than a predefined threshold radio distance;

for at least one wireless device of the first wireless device and the second wireless device for which the radio distance between the at least one wireless device and the base station closest to the at least one wireless device is determined to be less than a predefined threshold radio distance, determining that the base station closest to the at least one wireless device is not equipped with an interference cancellation receiver; and in response, selecting a downlink resource of the cellular communication network as the resource for the direct device-to-device communication link between the first wireless device and the second wireless device.

13. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a heterogeneous service area;

determining that neither of the first wireless device and the second wireless device is within a cell of a low power base station;

determining that either a radio distance between the first wireless device and a base station closest to the first wireless device is less than a predefined threshold radio distance or a radio distance between the second wireless device and a base station closest to the second wireless device is less than a predefined threshold radio distance;

for each wireless device of the first wireless device and the second wireless device for which the radio distance between the wireless device and the base station closest to the wireless device is determined to be less than a predefined threshold radio distance, determining that the base station closest to the wireless device is equipped with an interference cancellation receiver;

determining that at least a predefined threshold amount of one or more additional wireless devices that are proximate to the first and second wireless devices are equipped with interference cancellation receivers; and in response, selecting a downlink resource of the cellular communication network as the resource for the direct device-to-device communication link between the first wireless device and the second wireless device.

14. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a heterogeneous service area;

determining that neither of the first wireless device and the second wireless device is within a cell of a low power base station;

determining that either a radio distance between the first wireless device and a base station closest to the first wireless device is less than a predefined threshold radio distance or a radio distance between the second wireless device and a base station closest to the second wireless device is less than a predefined threshold radio distance;

for each wireless device of the first wireless device and the second wireless device for which the radio distance between the wireless device and the base station closest to the wireless device is determined to be less than a predefined threshold radio distance, determining that the base station closest to the wireless device is equipped with an interference cancellation receiver;

determining that less than a predefined threshold amount of one or more additional wireless devices that are proximate to the first and second wireless devices are equipped with interference cancellation receivers; and in response, selecting an uplink resource of the cellular communication network as the resource for the direct device-to-device communication link between the first wireless device and the second wireless device.

15. The method of claim 1 wherein selecting the resource for the direct device-to-device communication link between the first wireless device and the second wireless device in the cellular communication network comprises:

determining that the service area within the cellular communication network in which the first wireless device and the second wireless device are located is a homogeneous service area;

determining that either a radio distance between the first wireless device and a base station closest to the first wireless device is less than a predefined threshold radio distance or a radio distance between the second wireless device and a base station closest to the second wireless device is less than a predefined threshold radio distance;

for each wireless device of the first wireless device and the second wireless device for which the radio distance between the wireless device and the base station closest to the wireless device is determined to be less than a predefined threshold radio distance, determining that the closest base station to the wireless device is equipped with an interference cancellation receiver; and in response, selecting an uplink resource of the cellular communication network as the resource for the direct device-to-device communication link between the first wireless device and the second wireless device.

16. The method of claim 1 wherein selecting the resource for the direct device-to-device communication link between the first wireless device and the second wireless device in the cellular communication network comprises:
- determining that the service area within the cellular communication network in which the first wireless device and the second wireless device are located is a heterogeneous service area;
- determining that neither of the first wireless device and the second wireless device is within a cell of a low power base station;
- determining that either a radio distance between the first wireless device and a base station closest to the first wireless device is less than a predefined threshold radio distance or a radio distance between the second wireless device and a base station closest to the second wireless device is less than a predefined threshold radio distance;
- for each wireless device of the first wireless device and the second wireless device for which the radio distance between the wireless device and the base station closest to the wireless device is determined to be less than a predefined threshold radio distance, determining that the base station closest to the wireless device is equipped with an interference cancellation receiver; and
- in response, selecting an uplink resource of the cellular communication network as the resource for the direct device-to-device communication link between the first wireless device and the second wireless device.

17. The method of claim 1 wherein selecting the resource for the direct device-to-device communication link between the first wireless device and the second wireless device in the cellular communication network comprises:
- determining that the service area within the cellular communication network in which the first wireless device and the second wireless device are located is a heterogeneous service area;
- determining that at least one of the first wireless device and the second wireless device is within a cell of a low power base station;
- determining that at least one of the low power base station and any base station closest to the first and second wireless devices that is less than a predefined threshold radio distance from a corresponding one of the first and second wireless devices is not equipped with an interference cancellation receiver; and
- in response, selecting a downlink resource of the cellular communication network as the resource for the direct device-to-device communication link between the first wireless device and the second wireless device.

18. The method of claim 1 wherein selecting the resource for the direct device-to-device communication link between the first wireless device and the second wireless device in the cellular communication network comprises:
- determining that the service area within the cellular communication network in which the first wireless device and the second wireless device are located is a heterogeneous service area;
- determining that at least one of the first wireless device and the second wireless device is within a cell of a low power base station;
- determining that each of the low power base station and any base station closest to the first and second wireless devices that is less than a predefined threshold radio distance from a corresponding one of the first and second wireless devices is equipped with an interference cancellation receiver; and
- in response, selecting an uplink resource of the cellular communication network as the resource for the direct device-to-device communication link between the first wireless device and the second wireless device.

19. The method of claim 1 wherein selecting the resource for the direct device-to-device communication link between the first wireless device and the second wireless device in the cellular communication network comprises:
- determining that the service area within the cellular communication network in which the first wireless device and the second wireless device are located is a heterogeneous service area;
- determining that at least one of the first wireless device and the second wireless device is within a cell of a low power base station;
- determining that each of the low power base station and any base station closest to the first and second wireless devices that is less than a predefined threshold radio distance from a corresponding one of the first and second wireless devices is equipped with an interference cancellation receiver;
- determining that at least a predefined threshold amount of one or more additional wireless devices that are proximate to the first and second wireless devices are equipped with interference cancellation receivers; and
- in response, selecting a downlink resource of the cellular communication network as the resource for the direct device-to-device communication link between the first wireless device and the second wireless device.

20. The method of claim 1 wherein selecting the resource for the direct device-to-device communication link between the first wireless device and the second wireless device in the cellular communication network comprises:
- determining that the service area within the cellular communication network in which the first wireless device and the second wireless device are located is a heterogeneous service area;
- determining that at least one of the first wireless device and the second wireless device is within a cell of a low power base station;
- determining that each of the low power base station and any base station closest to the first and second wireless devices that is less than a predefined threshold radio distance from a corresponding one of the first and second wireless devices is equipped with an interference cancellation receiver;
- determining that less than a predefined threshold amount of one or more additional wireless devices that are proximate to the first and second wireless devices are equipped with interference cancellation receivers; and
- in response, selecting an uplink resource of the cellular communication network as the resource for the direct device-to-device communication link between the first wireless device and the second wireless device.

21. The method of claim 1 wherein the control node is a serving base station of at least one of the first wireless device and the second wireless device.

22. The method of claim 1 wherein selecting the resource for the direct device-to-device communication link between the first wireless device and the second wireless device in the cellular communication network comprises determining whether at least one of the first wireless device and the second wireless device is within a cell of a low power base station.

23. The method of claim 22 wherein the service area is determined to be a heterogeneous service area if at least one of the first wireless device and the second wireless device is within a cell of a low power base station.

24. The method of claim 22 wherein the service area is treated as a homogeneous service area if both the first wireless device and the second wireless device are not within a cell of a low power base station.

25. A control node in a cellular communication network comprising:
   one or more communication interfaces; and
   a processing subsystem associated with the one or more communication interfaces configured to:
      select a resource for a direct device-to-device communication link between a first wireless device and a second wireless device in the cellular communication network based on a plurality of criteria comprising a service area type for a service area within the cellular communication network in which the first wireless device and the second wireless device are located, wherein the service area type for the service area is one of a group consisting of: a homogeneous service area in which all of the base stations in the service area are macro base stations, and a heterogeneous service area in which one or more of the base stations in the service area are low-power base stations; and
      communicate an indicator of the resource selected for the direct device-to-device communication link to at least one of the first wireless device and the second wireless device via the one or more communication interfaces.

* * * * *